United States Patent
Mizuno et al.

(10) Patent No.: US 11,372,552 B2
(45) Date of Patent: *Jun. 28, 2022

(54) STORAGE DEVICE

(71) Applicant: Hitachi, Ltd., Tokyo (JP)

(72) Inventors: Makio Mizuno, Tokyo (JP); Kentaro Shimada, Tokyo (JP); Ryosuke Matsubara, Tokyo (JP); Midori Kurokawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/126,653

(22) Filed: Dec. 18, 2020

(65) Prior Publication Data

US 2021/0109661 A1    Apr. 15, 2021

Related U.S. Application Data

(63) Continuation of application No. 16/818,047, filed on Mar. 13, 2020, now Pat. No. 10,901,626.

(30) Foreign Application Priority Data

Aug. 2, 2019   (JP) .............................. JP2019-142713

(51) Int. Cl.
*G06F 3/06* (2006.01)
*G06F 11/14* (2006.01)
(Continued)

(52) U.S. Cl.
CPC .......... *G06F 3/0614* (2013.01); *G06F 3/0647* (2013.01); *G06F 3/0653* (2013.01);
(Continued)

(58) Field of Classification Search
CPC ...... G06F 3/0617; G06F 3/0646; G06F 12/00; G06F 13/00
See application file for complete search history.

(56) References Cited

U.S. PATENT DOCUMENTS

2006/0253619 A1* 11/2006 Torudbakken ...... G06F 13/4022
710/31
2008/0126698 A1   5/2008 Honda
(Continued)

FOREIGN PATENT DOCUMENTS

| JP | 2009267771 A | 11/2009 |
|---|---|---|
| JP | 6070732 B2 | 2/2017 |
| JP | 2018-190368 A | 11/2018 |

OTHER PUBLICATIONS

Japanese Office Action received in corresponding Japanese Application No. 2019-142713 dated May 25, 2021.
(Continued)

*Primary Examiner* — Getente A Yimer
(74) *Attorney, Agent, or Firm* — Mattingly & Malur, PC (57) ABSTRACT

To provide stable processing performance and perform an appropriate failure processing in a storage device. A storage device includes a plurality of controllers; a plurality of storage drives; and a switch device including a plurality of controller-side ports respectively connected to the plurality of controllers and a plurality of drive-side ports respectively connected to the plurality of storage drives. The switch device performs address translations between the plurality of controller-side ports and the plurality of drive-side ports.

10 Claims, 6 Drawing Sheets

(51) Int. Cl.
*G06F 11/07* (2006.01)
*G06F 13/10* (2006.01)
(52) U.S. Cl.
CPC ......... *G06F 3/0659* (2013.01); *G06F 3/0683* (2013.01); *G06F 11/1464* (2013.01); *G06F 11/1469* (2013.01)

(56) References Cited

U.S. PATENT DOCUMENTS

| | | | | |
|---|---|---|---|---|
| 2012/0185643 | A1* | 7/2012 | DeKoning | G06F 3/067 711/114 |
| 2014/0298086 | A1* | 10/2014 | Haneda | G11C 7/10 714/6.3 |
| 2015/0378641 | A1* | 12/2015 | Franke | G06F 3/067 710/74 |
| 2016/0117127 | A1* | 4/2016 | Yamamoto | G06F 3/0689 711/114 |
| 2016/0217094 | A1 | 7/2016 | Yokoyama | |
| 2016/0378353 | A1* | 12/2016 | Schmisseur | G06F 3/0622 711/114 |
| 2018/0314666 | A1 | 11/2018 | Tanaka et al. | |

OTHER PUBLICATIONS

Second Japanese Office Action received in corresponding Japanese Application No. 2019-142713 dated Dec. 21, 2021.

* cited by examiner

| Node# | CTL# | CPU# | Port# | Send target |
|---|---|---|---|---|
| 0 | 0 | 0 | 0 | 1 |
| 0 | 0 | 0 | 1 | 1 |
| 0 | 0 | 0 | 2 | 0 |
| 0 | 0 | 0 | 3 | 0 |
| 0 | 0 | 1 | 0 | 1 |
| 0 | 0 | 1 | 1 | 1 |
| 0 | 0 | 1 | 2 | 1 |
| 0 | 0 | 1 | 3 | 1 |
| 0 | 1 | 0 | 0 | 1 |
| 0 | 1 | 0 | 1 | 1 |
| 0 | 1 | 0 | 2 | 1 |
| 0 | 1 | 0 | 3 | 1 |
| ... | ... | ... | ... | ... |

MESSAGE TRANSMISSION DESTINATION MANAGEMENT TABLE

STORAGE DEVICE

CLAIM OF PRIORITY

The present application is a Continuation application of U.S. Ser. No. 16/818,047, filed Mar. 13, 2020, which claims priority from Japanese patent application JP 2019-142713 filed on Aug. 2, 2019, the content of which is hereby incorporated by reference into this application.

BACKGROUND OF THE INVENTION

1. Field of the Invention

The present disclosure relates to a storage device.

2. Description of the Related Art

A storage device includes a storage controller that controls data transfer between a host computer connected to the storage device and a storage medium in the storage device. The storage controller includes a front-end interface for connecting the host computer, a back-end interface for connecting a number of drives as the storage medium, a processor for controlling the storage device, a memory connected to the processor, and the like.

Further, PCI Express (hereinafter, PCIe) is known as one of the standards of a communication network for connecting the processor, the front-end interface, the back-end interface, and the like. Further, in order to match a scale of use of a user who uses the storage device, the storage device often includes an interconnect for interconnecting a plurality of the storage devices.

One of the most important factors in the storage device used in mission-critical operations is availability. In order to provide this availability, the storage device uses, for example, a dual-controller architecture in which the storage controller described above has a redundant configuration.

In the dual-controller architecture, for example, PCIe and Infiniband are usable as interfaces for connecting controllers. When one of the dual controllers on one side becomes unusable for some reason, a normal controller on the other side detects an abnormality, and the availability is guaranteed by continuing I/O from the host computer until the unusable controller recovers.

In recent years, due to increase in capacity of a single drive and development of a virtualization technique, data used by a plurality of host computers or applications are often mixed in the single drive. Therefore, for example, when an abnormality is detected in a single drive, it is necessary to notify both controllers of the abnormality. This is because in the storage device, both of the controllers operate in cooperation with each other, and it is necessary to promptly perform appropriate processing without contradiction by notifying both the controllers of occurrence of the abnormality.

On the other hand, a flash memory is becoming cheaper and more advanced, and there is a trend that a solid state drive (SSD) in which the flash memory is mounted on the drive is mounted in the storage device. With the spread of such an SSD, non-volatile memory Express (NVM Express) has recently been formulated as a new communication protocol aimed at eliminating the increase in processing time. The NVM Express is located in an application layer as a protocol layer, and uses the PCIe as a physical layer.

By the way, a PCI Express domain has a structure in which switches, bridges, and endpoint devices are connected on a tree, with a device called a root complex at the top. The root complex is a device located at the root of a PCI Express system.

The bridge is often used for a protocol translation to be connected to a legacy device, such as a PCI or a PCI-X endpoint, using PCI Express. The switch is used to increase the number of PCI Express ports. The endpoint is a device, for example, a hard disk or an SSD that performs I/O. Due to a specification of PCI Express, the endpoint can only belong to one PCI Express domain.

One of the most important factors in the storage device used in the mission-critical operations is high performance. The storage device uses a configuration in which any drive can be accessed by the storage controller in order to provide the availability and the high performance mentioned earlier. The storage controller includes the root complex and a plurality of processors having root ports. Further, the storage device includes a plurality of storage controllers according to a scale of the device. However, due to the specifications of PCI Express, the SSD that supports the NVMe, which is an endpoint, can only belong to one PCI Express system, that is, one processor. That is, it is not possible to use a configuration in which any drive can be accessed by the storage controller.

As a method for solving the problem, there is a non-transparent bridge (hereinafter, referred to as NTB). A storage device using the NTB is disclosed in, for example, JP-A-2018-190368 (Patent Literature 1), which discloses a technique that enables an efficient communication between storage control units via a back-end switch that connects the storage control unit with a storage device. A virtual switch (VS) which logically divides a switch is provided for each root port, and the switches are connected by the NTB of the back-end switch. The drive belongs to one of the VSs according to the specification of PCI Express.

Here, from a viewpoint of the availability, when an error is detected in a PCI port on a drive side, the drive normally notifies a root port to which the drive belongs. The drive issues a memory write command notifying a predetermined area of a processor main memory of the fact. At this time, according to the specification of PCI Express, there is only one notification destination from the drive.

By using the NTB technique and the technique disclosed in Patent Literature 1, a configuration is possible in which any drive can be accessed by the storage controller. However, Patent Literature 1 does not disclose a case of three or more storage controllers.

On the other hand, the virtual switch in the back-end switch disclosed in Patent Literature 1 is required for each root complex (for example, a processor) according to the specification of PCI Express. According to Patent Literature 1, it is possible to access any drive by the storage controller by applying the NTB between one or more back-end switches. According to Patent Literature 1, the drive is associated with one virtual switch provided in the back-end switch.

These include the following issues. That is, as the number of the processors increases, the number of the virtual switches also increases. Therefore, when the processor accesses any drive, the number of the virtual switches through which the processor passes differs between the drives. In other words, when the processor accesses any drive, performance variation occurs due to performance unevenness associated with crossing virtual switches. As a result, drive access with low performance may be dragged, and the performance of the entire system may be reduced. Further, since the processor passes through a number of the virtual switches, a design of an address translation becomes complicated when designing the storage device.

On the other hand, when the PCI port is abnormal, the processor cannot communicate with the drive, so that a timeout occurs for the processor performing the access. In this case, since a detection of an abnormality takes time, it is better to promptly notify the processor of the error, stop the drive access, and perform failure processing. As described above, when there are the plurality of processors, it is important to notify all the processors accessible to the drive that the abnormality has been detected, but when the specification of PCI Express is used, only a single processor can be notified.

Therefore, a storage device and an information processing method capable of providing stable processing performance and performing appropriate failure processing are desired.

SUMMARY OF THE INVENTION

A storage device according to an aspect of the present disclosure includes: a plurality of controllers; a plurality of storage drives; and a switch device including a plurality of controller-side ports respectively connected to the plurality of controllers and a plurality of drive-side ports respectively connected to the plurality of storage drives. The switch device is configured to perform address translations between the plurality of controller-side ports and the plurality of drive-side ports.

According to the embodiment of the disclosure, stable processing performance can be provided and appropriate failure processing can be performed in the storage device.

DESCRIPTION OF THE PREFERRED EMBODIMENTS

Hereinafter, embodiments of the invention will be described with reference to the drawings. In the following description, various types of information may be described using expressions such as "management table", but various types of information may be expressed using a data structure other than a table. Further, the "management table" can be called "management information" to indicate that the "management table" does not depend on the data structure.

Further, in some cases, processing is described with a "program" as a subject. The program is performed by a processor, for example, a central processing unit (CPU), and performs predetermined processing. Since the processing is appropriately performed using a storage resource (for example, a memory) and a communication interface device (for example, a communication port), the subject of the processing may be a processor. The processor may have dedicated hardware in addition to the CPU. A computer program may be installed on each computer from a program source. The program source may be provided by, for example, a program distribution server or a storage medium.

Further, each element is identifiable by a number or the like, but other types of identification information such as a name may be used as long as the information is identifiable. Although the same reference numerals are given to the same parts in the drawings and the description of the invention, the invention is not limited to the present example, and all application examples matching ideas of the invention are included in the technical scope of the invention. Further, unless otherwise limited, each component may be either plural or singular.

Hereinafter, the storage device and an information processing method, for example, a storage device and an information processing method suitable for being applied to a storage device that is equipped with a solid state drive (SSD) as a storage drive (hereinafter, also simply called a drive) will be disclosed. More specifically, in a configuration example of the storage device disclosed below, a PCIe (PCI Express) switch (physical switch) in a drive box including the storage drive performs a protocol translation in communication between a plurality of storage controllers and a plurality of storage drives. Accordingly, stable processing performance can be provided and appropriate failure processing can be promptly performed. The drive supports, for example, NVMe (NVM Express). The physical switch may be used instead of a virtual switch.

Hereinafter, details of the present embodiment will be described with reference to the drawings. Details of a PCIe standard and an NVMe standard are publicly known, detailed description thereof will be omitted, and only matters necessary for the description of the present embodiment will be appropriately described.

Figure 1:
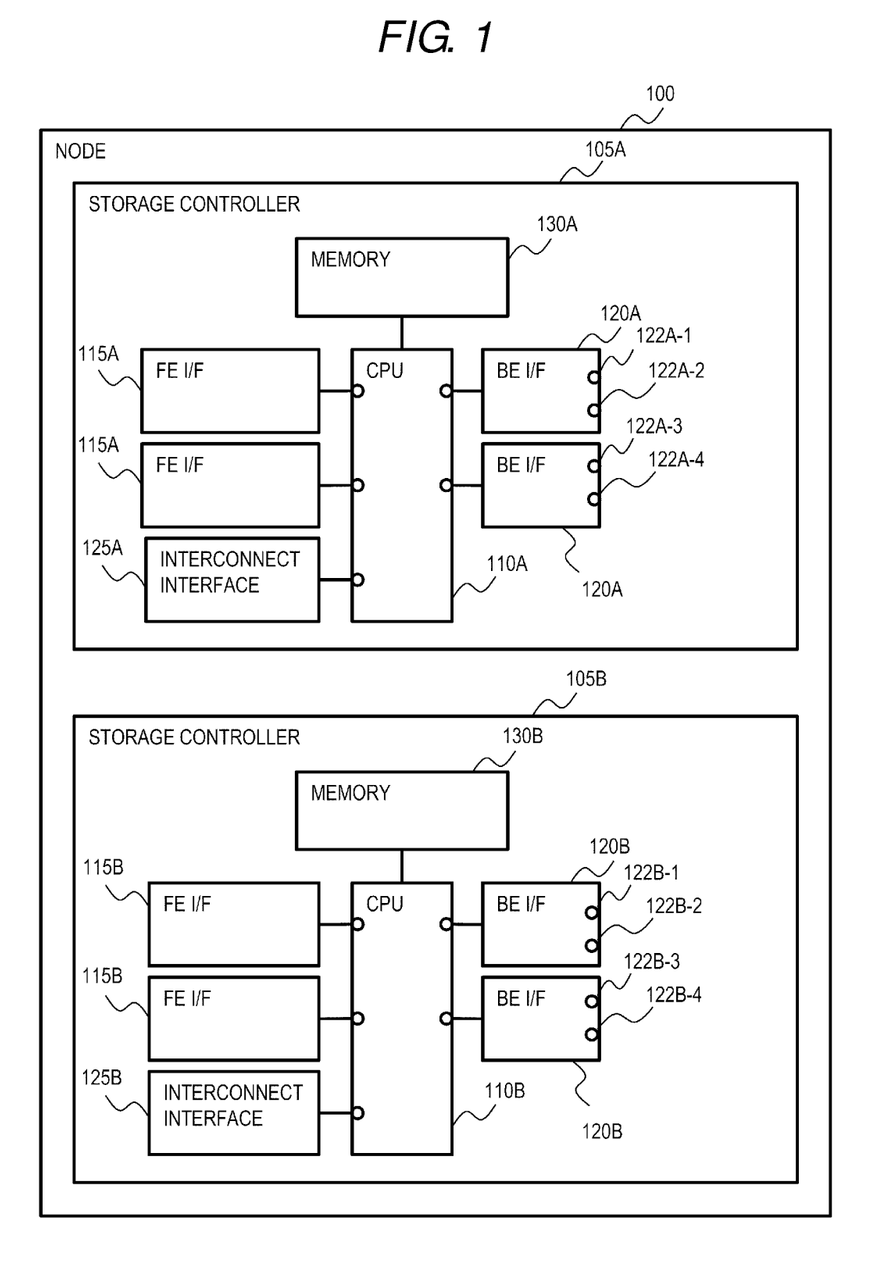
FIG. 1 is a diagram showing a configuration of a node provided in a storage device.

FIG. 1 is a diagram showing a configuration of a node provided in the storage device according to the present embodiment. The storage device includes one or a plurality of drives (such as SSDs) (not shown in FIG. 1) and one or a plurality of nodes. The node includes one or a plurality of storage controllers (also simply called controllers) that control input/output of data to/from the drives.

A node 100 according to the present embodiment includes two controllers 105A and 105B in order to continuously provide services while placing importance on availability. The two controllers 105A and 105B have the same configuration and function in the present example. The storage controller 105A includes a processor (CPU) 110A, front-end interfaces 115A, back-end interfaces 120A, an interconnect interface 125A, and a memory 130A. The storage controller 105B includes a processor 110B, front-end interfaces 115B, back-end interfaces 120B, an interconnect interface 125B, and a memory 130B.

Hereinafter, the storage controller 105, the processor 110, and the front-end interface 115 represent any storage controller, any processor, and any front-end interface, respectively. The back-end interface 120, the interconnect interface 125, and the memory 130 represent any back-end interface, any interconnect interface, and any memory, respectively.

The processor 110 controls each component such as the front-end interface 115 in the storage controller 105. For example, the processor 110 sets a data transfer parameter of the front-end interface 115. The processor 110 monitors failures in the node 100, and when detecting a failure, performs processing corresponding to the failure.

The front-end interface 115 includes an interface connected to a host computer (not shown), and performs predetermined protocol processing on a packet received from the host computer or a packet transmitted to the host computer. The host computer is a computer device provided with information processing resources such as a processor and a memory, and includes, for example, an open system and a mainframe computer. The host computer transmits a write command or a read command to the storage device via a network.

For example, the front-end interface 115 obtains information such as a storage location of read data or write data and a capacity of the packet in the drive described later from the packet received from the host computer. Further, the front-end interface 115 specifies a command provided in the packet, and converts the received packet into a form used inside the storage controller 105.

The front-end interface 115 generates a packet that can be transmitted to the host computer with respect to the packet to be transmitted to the host computer, based on a communication protocol between the storage controller 105 and the host computer, by adding identification data of the host computer, which is a transmission destination, and control data related to a command transmitted to the host computer, and the like to the read data.

The back-end interface 120 is an interface that allows the processor 110 to perform data communication with the drive box and the drive in the drive box described below. When a protocol outside the back-end interface 120 is different from a protocol on the processor 114 side, the back-end interface 120 performs the protocol translation. For example, the protocol on the processor 114 side is PCIe, and the protocol outside the back-end interface 120 is PCIe, Fiber Channel, or Ethernet (registered trademark).

The back-end interface 120 includes a back-end port (downstream port) for connecting the node 100 to the drive box. In the configuration example of FIG. 1, one back-end interface 120A in the storage controller 105A includes back-end ports 122A-1 and 122A-2, and another back-end interface 120A includes back-end ports 122A-3 and 122A-4. One back-end interface 120B in the storage controller 105B includes back-end ports 122B-1 and 122B-2, and another back-end interface 120B includes back-end ports 122B-3 and 122B-4.

The back-end port may be a part of a switch in the back-end interface. The back-end interface 120 may be a part of the processor. In this case, the back-end port for connecting to the drive box may be built in the processor.

The interconnect interface 125 is a communication interface between the plurality (two in the configuration example of FIG. 1) of storage controllers 105. Communication between the storage controllers 105 may use, for example, Infiniband using an interface card or Ethernet, or may use PCI Express using a non-transparent bridge (NTB). Any interface capable of providing data communication between the processors 110 or between the memories 130 can be used.

Figure 2:
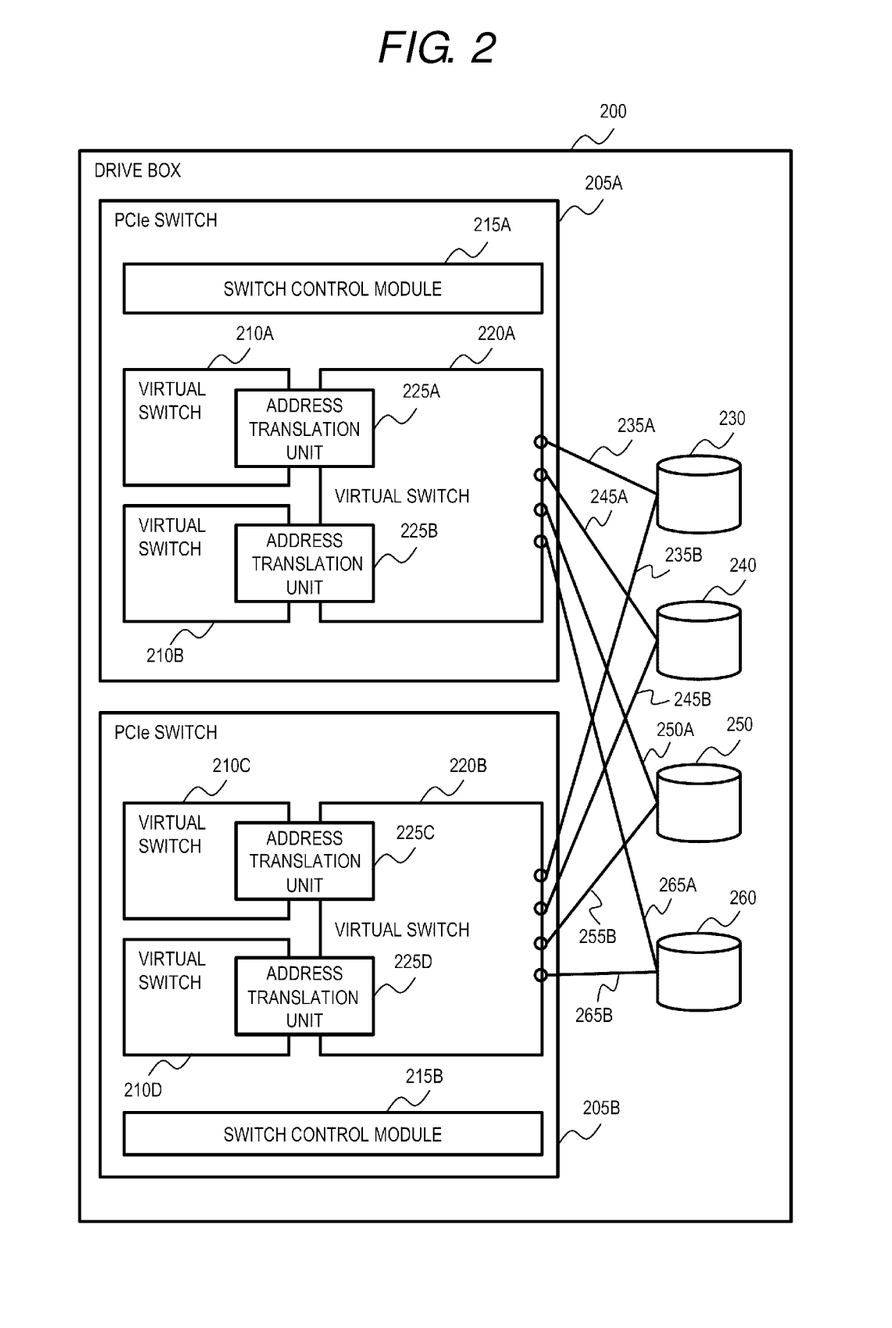
FIG. 2 is a diagram showing a configuration example of a drive box provided in the storage device.

FIG. 2 is a diagram showing a configuration example of a drive box 200 provided in the storage device.

The drive box 200 includes PCIe switches 205A and 205B (hereinafter, any PCIe switch is referred to as a PCIe switch 205), and storage drives 230, 240, 250, and 260.

The PCIe switch 205A includes root complex connection virtual switches 210A and 210B, address translation units 225A and 225B, a drive connection virtual switch 220A, and a switch control module 215A. The PCIe switch 205B includes root complex connection virtual switches 210C and 210D, address translation units 225C and 225D, a drive connection virtual switch 220B, and a switch control module 215B. The PCIe switches 205A and 205B each include a plurality of controller-side ports (respectively a virtual port or a physical port) to which the storage controllers are connected, and a plurality of drive-side ports (respectively a virtual port or a physical port) to which the storage drives are connected.

Hereinafter, the PCIe switch 205, the root complex connection virtual switch (controller-side switch) 210, the address translation unit 225, the drive connection virtual switch (drive-side switch) 220, and the switch control module 215 represent any PCIe switch, any root complex connection virtual switch, any address translation unit, any drive connection virtual switch, and any switch control module, respectively.

The PCIe switch 205 includes, for example, a processor and a memory. The processor functions as the root complex connection virtual switch, the address translation unit, the drive connection virtual switch, and the switch control module by operating according to a program stored in the memory. The PCIe switch 205 can include, in addition to the processor, a logic circuit that performs a predetermined operation. The scalability of the storage device is improved by the virtual switch.

The drive box 200 further includes connection paths 235A, 235B, 245A, 245B, 255A, 255B, 265A, and 265B between the drive connection virtual switches and the drives.

The PCIe switch 205 is a device for connecting the back-end interface 120 of the storage controller 105 with the drive. In order to improve the availability and the performance of the storage device, the drive is often a two-port drive, so-called dual-port drive. Therefore, the storage device includes two PCIe switches 205 connected to the respective ports of the dual-port drive.

The root complex connection virtual switch 210 is a logical (virtual) PCIe switch configured in the PCIe switch 205. The root complex connection virtual switch 210 connects a root complex of a PCIe domain provided in the processor with the drive connection virtual switch 220 described later. More specifically, the root complex connection virtual switch 210 connects the back-end interface 120 of the storage controller with the drive connection virtual switch 220. Basically, root complex connection virtual switches 210 as many as the processors accessing each drive are configured such that each drive can be accessed by the plurality of processors.

The drive connection virtual switch 220 is the logical (virtual) PCIe switch configured in the PCIe switch 205, similar to the root complex connection virtual switch 210. The drive connection virtual switch 220 connects the root complex connection virtual switch 210 with the drive. As shown in FIG. 2, the drive connection virtual switch 220 in the PCIe switch 205 may be a single switch, or a plurality of the drive connection virtual switches may be configured in the PCIe switch 205.

The address translation unit 225 performs translations between a communication protocol of the root complex connection virtual switch 210 and a communication protocol of the drive connection virtual switch 220 by referring to address translation information. The address translation unit 225 is, for example, a non-transparent bridge (NTB).

The address translation unit 225 translates control information of a PCIe packet arriving at the root complex connection virtual switch 210 into control information adapted in the PCIe domain including a transmission destination drive. The control information includes header information of the PCIe packet and an address of an access destination. The address translation unit 225 translates the control information of the PCIe packet arriving at the drive connection virtual switch 220 into control information adapted in a PCIe domain including a transmission destination processor. The control information includes the header information of the PCIe packet and a transmission destination address.

As described above, the PCIe switch 205 includes the root complex connection virtual switch 210, the drive connection virtual switch 220, and the address translation unit 225 between the root complex connection virtual switch 210 and the drive connection virtual switch 220. Effects generated thereby are as follows.

In the processor 110 of the storage controller, the processor 110 accesses the drive via the root complex connection virtual switch 210, the address translation unit 225, and the drive connection virtual switch 220. This is the same for all the drives. That is, the processor 110 can access any drive at the same distance. Therefore, by adopting the configuration as shown in FIG. 2, it is possible to provide the stable processing performance in the storage device.

The drives 230, 240, 250, and 260 are devices that support NVMe and store data of the host computer. The drives 230, 240, 250, and 260 can use various media, such as an SSD on which a non-volatile memory such as a flash memory is mounted, a magnetoresistive random access memory (MRAM), a phase change memory, a resistant random-memory (ReRAM), a ferroelectric random access memory (FeRAM). A multistage connection configuration in which the plurality of PCIe switches 205 are connected and the drives are further connected may be applied to the storage device.

In general, the storage device may form a redundant array of inexpensive disks (RAID) group by the plurality of drives, and may store data transmitted from the host computer to a logical volume that is a logical storage area configured with the RAID group. When a failure occurs in a drive forming the RAID group, the storage device can restore data stored in the drive in which the failure has occurred by using data and parity of the other drives belonging to the same RAID group.

Figure 3:
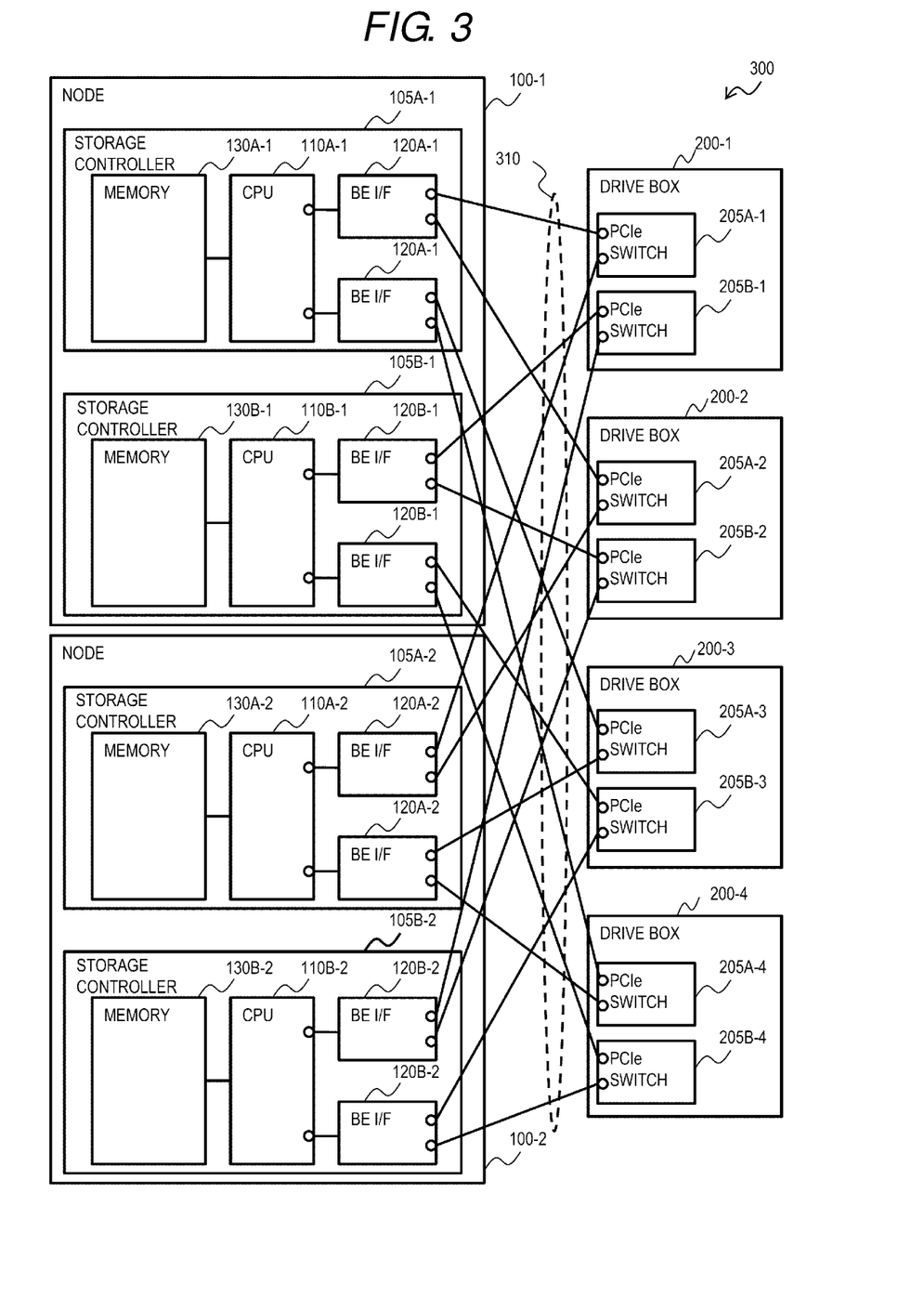
FIG. 3 is a diagram showing an example of the storage device.

FIG. 3 is a diagram showing an example of a storage device 300 according to the present embodiment. The storage device 300 includes two nodes 100-1 and 100-2 (hereinafter, any node is referred to as the node 100) and four drive boxes 200-1, 200-2, 200-3, and 200-4 (hereinafter, any drive box is referred to as the drive box 200), and a link 310 connecting the node 100 with the drive box 200.

The node 100-1 includes two storage controllers 105A-1 and 150B-1. The storage controller 105A-1 includes a memory 130A-1, a processor 110A-1, and two back-end interfaces 120A-1. The storage controller 105B-1 includes a memory 130B-1, a processor 110B-1, and two back-end interfaces 120B-1.

The node 100-2 includes two storage controllers 105A-2 and 150B-2. The storage controller 105A-2 includes a memory 130A-2, a processor 110A-2, and two back-end interfaces 120A-2. The storage controller 105B-2 includes a memory 130B-2, a processor 110B-2, and two back-end interfaces 120B-2.

The drive box 200-1 includes two PCIe switches 205A-1 and 205B-1. The drive box 200-2 includes two PCIe switches 205A-2 and 205B-2. The drive box 200-3 includes two PCIe switches 205A-3 and 205B-3. The drive box 200-4 includes two PCIe switches 205A-4 and 205B-4. Details of components of the node 100 and the drive box 200 are as described with reference to FIGS. 1 and 2.

In the storage device 300 shown in FIG. 3, the link 310 is connected such that the single storage controller 105 can access all four drive boxes 200. From a viewpoint of the availability of the storage device, when the node 100 becomes unusable due to some abnormality, for example, the even-numbered storage controller 105 is connected to the even-numbered PCIe switch 205 of the drive box 200 so as to enable continuous access from the normal node 100.

In this way, when the storage controller in the node or the node becomes unusable due to some abnormality, the normal storage controller or the normal node can continuously access all the drives of the storage device 300, and the availability of the entire storage device can be maintained.

Figure 4:
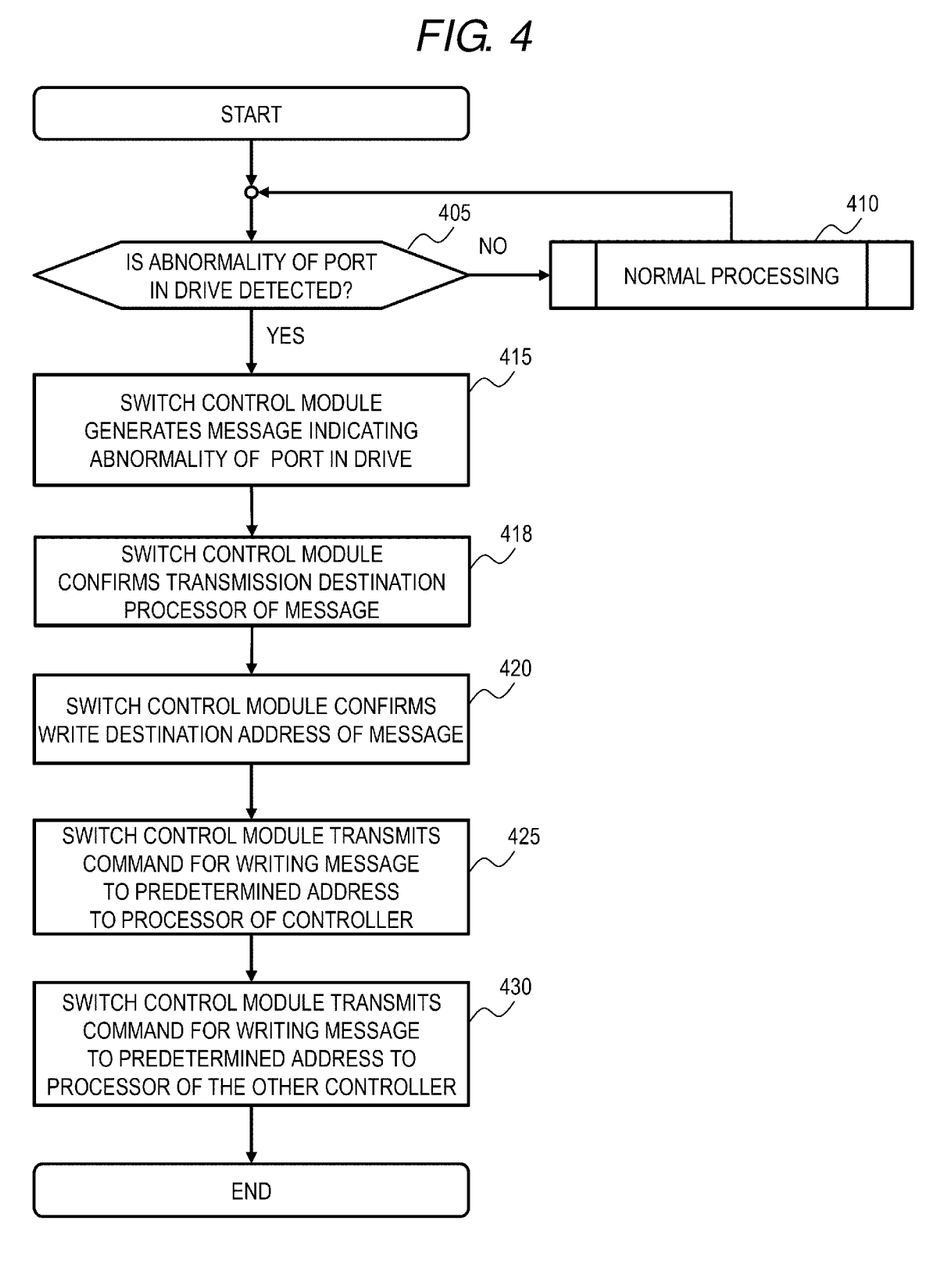
FIG. 4 is a flowchart showing a procedure for notifying a processor of an abnormality that has occurred on a drive side in the storage device.

FIG. 4 is a flowchart showing a procedure for notifying the processor of an abnormality that has occurred on the drive side in the storage device 300 of the present embodiment. With this procedure, it is possible to promptly perform the appropriate failure processing on the abnormality that has occurred on the drive side. An implementation subject of the flowchart shown in FIG. 4 is the switch control module 215 shown in FIG. 2. First, in step 405, if the switch control module 215 has not detected an abnormality of a port in the connected drive (405: NO), the processing proceeds to step 410. If the switch control module 215 detects an abnormality of a port in the drive (405: YES), the processing proceeds to step 415.

In step 410, the switch control module 215 performs normal processing. Examples of the normal processing include state monitoring of the entire PCIe switch 205, communication control with the processor of the storage controller, processing for an abnormality that has occurred in the PCIe switch 205, and the like. The switch control module 215 performs detection and confirmation of the abnormality of the port in the drive as a part of the normal processing.

In step 415, the switch control module 215 generates a message indicating the abnormality of the port in the drive to notify the processor 110 of the storage controller of the abnormality of the port in the drive. The message includes a drive identifier and information indicating a type of the abnormality.

In step 418, the switch control module 215 determines to which processor 110 the message generated in step 415 will be transmitted. The switch control module 215 determines the processor 110 that transmits the message and the path by referring to a message transmission destination management table 600. The message transmission destination management table 600 will be described later.

In step 420, the switch control module 215 confirms a write destination address for each of the transmission destination processors 110 of the message generated in step 410. The write destination address indicates an address in the memory 130 of the transmission destination processor. The switch control module refers to, for example, a message address field provided in a PCIe configuration register in the PCIe switch 205 to confirm the write destination address.

In step 425, the switch control module 215 issues a write command, which writes the message generated in step 415 to the write destination address of the memory 130 confirmed in step 420, to the processor 110 of the storage controller. The processor 110 writes the message to a specified write address according to the write command.

Subsequently, in step 430, the switch control module 215 issues the write command, which writes the message generated in step 415 to the write destination address confirmed in step 420, to the processor 110 of the other storage controller, and the processing is ended.

According to the flowchart shown in FIG. 4, any processor (controller) that can access the storage drive can be notified of an abnormality on the drive side, so that the storage device can promptly perform the appropriate failure processing.

Figure 5:
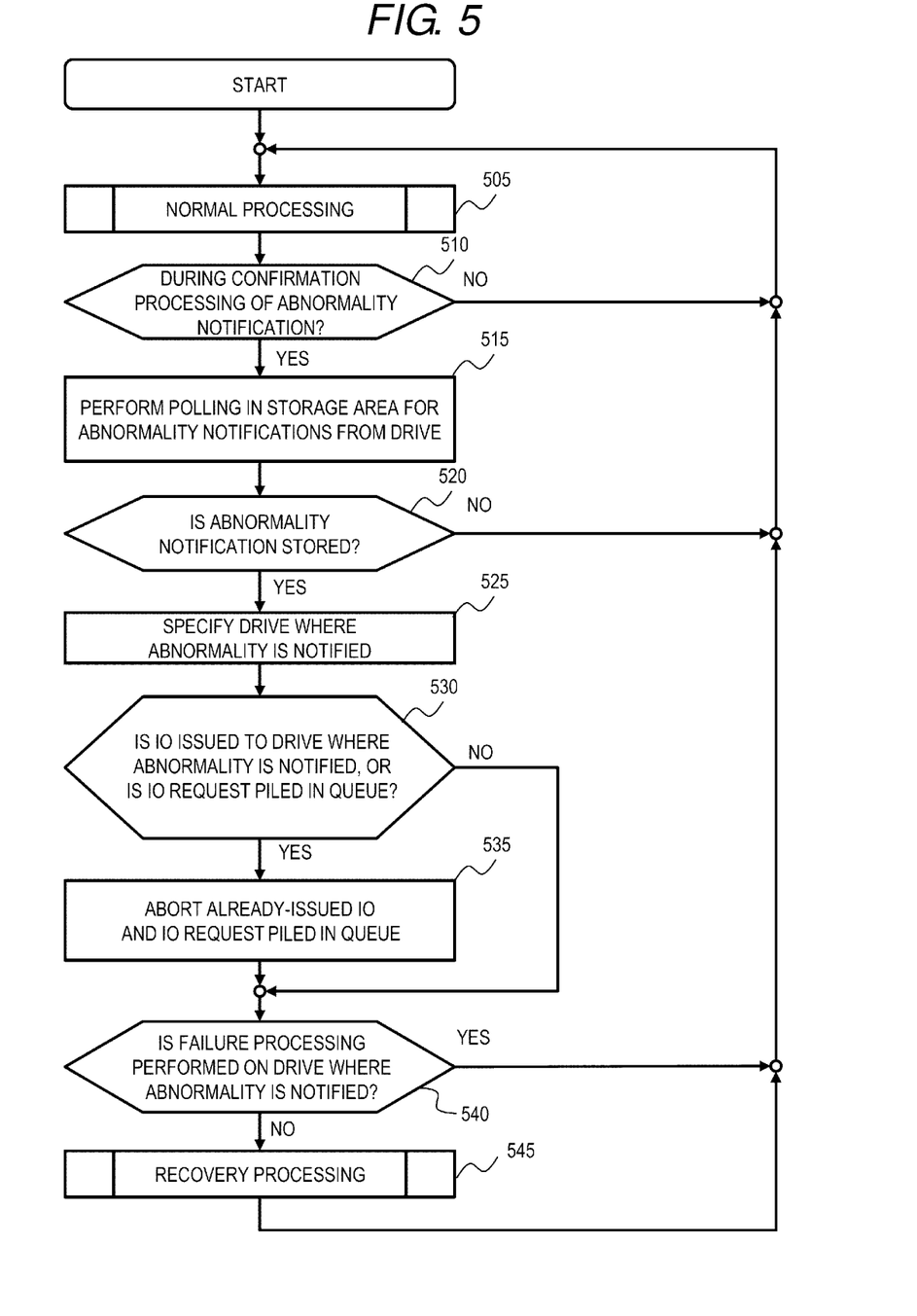
FIG. 5 is a flowchart showing a processing procedure of the processor in response to an abnormality notification received from the drive box.

FIG. 5 is a flowchart showing a processing procedure of the processor in response to an abnormality notification received from the drive box. According to the processing in the flowchart of FIG. 5, the appropriate failure processing can be promptly performed on an abnormality that has occurred on the storage drive side.

An implementation subject of the flowchart shown in FIG. 5 is a control program that operates on the processor 110 of the storage controller. The control program is stored in the memory 130 used by the processor 110.

First, the control program performs the normal processing in step 505. Here, the normal processing includes processing for controlling the storage device, read processing from the host computer, write processing, destaging processing for storing data, which is stored in a cache area provided in the memory 130 of the processor 110, in the drive, other processing related to functions for providing the business continuity, and the like.

In the normal processing, the control program confirms the abnormality notification of the storage drive received from the PCIe switch 205. In the normal processing, the processing may be performed at regular intervals or may be performed immediately in response to an interrupt.

In step 510, if a condition for confirming the abnormality notification is not satisfied (510: NO), the control program returns to step 505. If the condition for confirming the abnormality notification from the drive is satisfied (510: YES), the control program proceeds to step 515.

In step 515, the control program checks an area in the memory 130 for storing the abnormality notification of the storage drive. In step 520, if no abnormality notification is stored, the control program returns to step 505. If the abnormality notification is stored, the control program proceeds to step 525.

In step 525, the control program refers to the stored abnormality notification and specifies the storage drive in which the abnormality has occurred. In step 530, the control program confirms whether there is an already-issued IO request for the storage drive specified in step 525 by referring to management information for managing an already-issued IO request stored in the memory 130. Further, the control program confirms whether there is an unissued IO request for the storage drive specified in step 525 by referring to an IO request queue in the memory 130.

In step 535, the control program cancels (aborts) the already-issued IO request and the unissued IO request for the drive identified in step 525, which are confirmed in step 530. Accordingly, it is possible to avoid issuing an IO request to the abnormal storage drive and appropriately process an uncompleted IO request.

By performing the processing up to step 535, all the processors that can access the drive specified in step 525 can stop IO. Accordingly, a timeout due to the IO to/from the drive specified in step 525 can be avoided beforehand, so that the appropriate failure processing can be promptly performed.

In step 540, the control program confirms whether the other control program is performing failure processing on the drive specified in step 525 where the abnormality is notified. Information of the control program that is performing the failure processing is stored, for example, in a shared memory area of each storage controller 105. If the other control program is performing the failure processing on the drive specified in step 525 where the abnormality is notified, the processing returns to step 505 depending on the failure processing being performed, in order to appropriately complete the failure processing.

If the other control program has not performed the failure processing on the drive specified in step 525 where the abnormality is notified, the control program takes charge of recovery processing 545 of the drive specified in step 525 where the abnormality is notified. Accordingly, the recovery processing is appropriately performed. The recovery processing here includes, for example, clearing of failure information of the PCIe switch, initialization of the drive port, and the like.

By performing the flowchart shown in FIG. 5, the control program can promptly perform the appropriate failure processing on the abnormality that occurred on the drive side.

Figure 6:
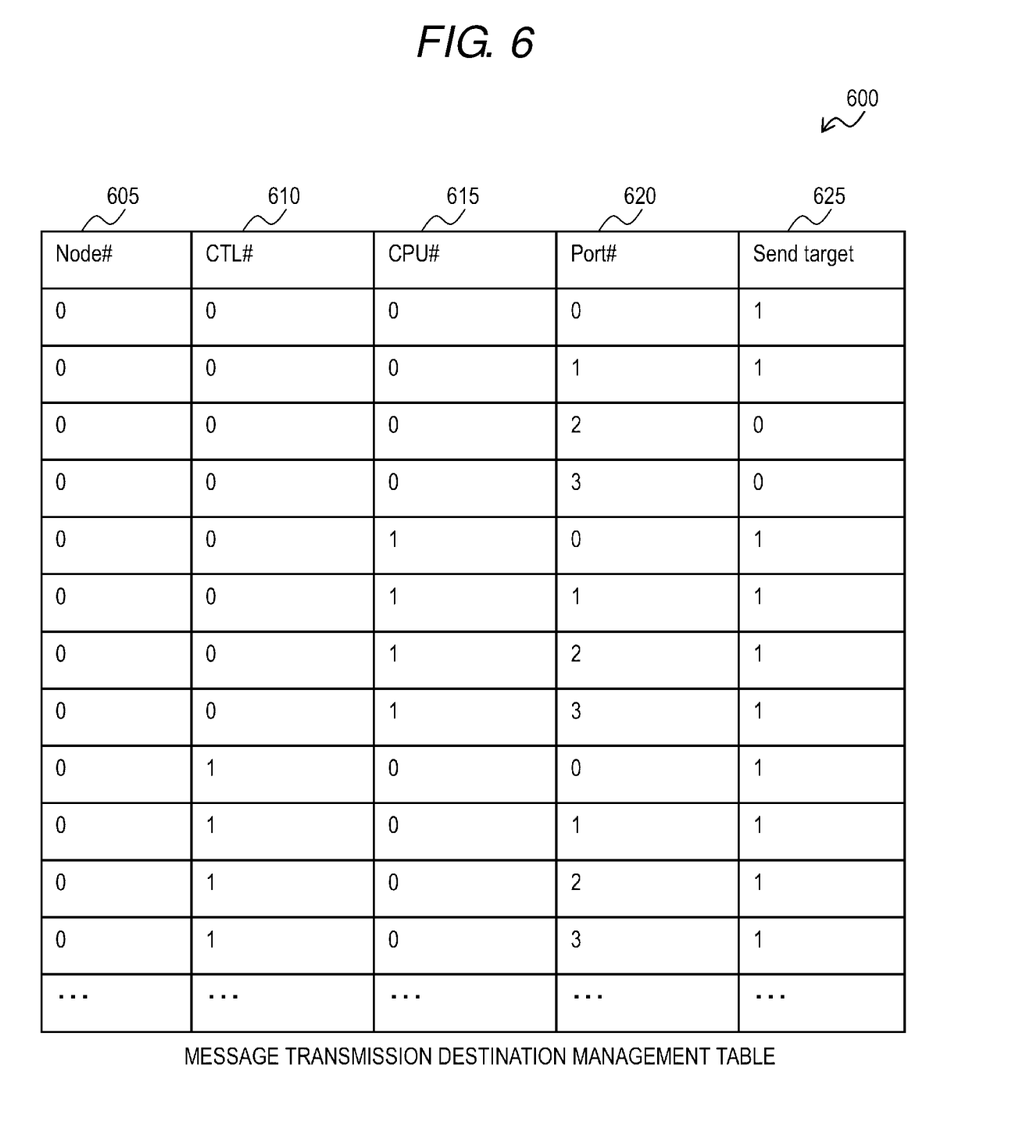
FIG. 6 is a diagram showing a message transmission destination management table in the storage device.

FIG. 6 is a diagram showing a message transmission destination management table in the storage device 300 of the present embodiment. A Node # column 605 indicates a serial number assigned to the node in the storage device 300. For example, in FIG. 3, a number of the node 100-1 can be Node #0, and a number of the node 100-2 can be Node #1.

A CTL # column 610 indicates a serial number assigned to the storage controller forming the nodes in the storage device 300. For example, in FIG. 3, a number of the storage controller 105A-1 of the node 100-1 can be CTL #0, and a number of the storage controller 105B-1 of the node 100-1 can be CTL #1.

A CPU # column 615 indicates a serial number assigned to the processor provided in the storage controller of the storage device 300. For example, in FIG. 3, a number of the processor 110A-1 of the node 100-1 can be CPU #0, and a number of the processor 110B-1 of the node 100-1 can be CPU #1.

A Port # column 620 indicates a serial number assigned to the communication port between the node and the drive box in the storage device 300. For example, in FIG. 1, a number of the back-end port 122A-1 can be Port #0, a number of the back-end port 122A-2 can be Port #1, a number of the back-end port 122A-3 can be Port #2, and a number of the back-end port 122A-4 can be Port #3.

As described above, each record indicates the transmission destination processor of the message and the port through which the message passes (the path through which the processor and the PCIe switch communicate with each other). One PCIe switch communicates with one processor via one or a plurality of ports.

The Send Target column 625 indicates the transmission destination selected by the switch control module to transmit the message generated in step 415 of FIG. 4. For example, in FIG. 6, a value of the node #0, the CTL #0, the CPU #0, and the Port #0 in the Send Target column 625 is "1". The value of the record of the node #0, the CTL #0, the CPU #0, and the Port #2 in the Send Target column 625 is "0".

In the Send Target column 625 of the message destination management table 600 of FIG. 6, "1" indicates that the record is the transmission destination of the message. It is assumed that Send Target "0" is not the transmission destination of the message. That is, the node #0, the CTL #0, the CPU #0, and the Port #0 are the transmission destination of the message, and the node #0, the CTL #0, the CPU #0, and the Port #2 are not the transmission destination of the message.

The message transmission destination management table 600 of FIG. 6 is generated by the control program that operates on the processor 110 of the storage controller, and is stored in a memory (not shown) in the PCIe switch that can be referred to by the switch control module. Then, the processor 110 of the storage controller appropriately updates the message transmission destination management table according to an operation status and the like of the back-end interface, and stores the message transmission destination management table in the memory in the PCIe switch each time.

The effect of the message transmission destination management table 600 in FIG. 6 will be described. First, the switch control module can confirm the transmission destination to which the message generated in step 415 of FIG. 4 is to be transmitted by referring to the message transmission destination management table 600. Accordingly, the load on the switch control module can be reduced.

For example, when one processor includes a plurality of the back-end ports and when the plurality of back-end ports are used equally to communicate with the drives in the drive box, the message may be transmitted using any of the back-end ports, so that in FIG. 6, the value of the Send Target column 625 is set to "1" for the node #0, the CTL #0, the CPU #1, and only the Port #0, and the value of the Send Target column 625 for the Port #1 to Port #3 may be set to "0".

Further, in some cases, the back-end interface 120 of the storage device 300 may be unusable for some reason. At this time, the processor 110 of the storage controller sets the value of the Send Target column 625 of the unusable back-end port to "0". Accordingly, the switch control module 215 can get the unusable back-end interface (back-end port) by referring to the message transmission destination management table, thereby avoiding unnecessary message transmission. Accordingly, the load on the switch control module can be reduced. Further, it is possible to avoid an error caused by transmitting the message to the unusable back-end interface.

As described above, in the storage device of the present embodiment, the switch device (PCIe switch) performs conversions between a communication protocol with the processor and a communication protocol with the storage drive. Accordingly, the communication performance between the processor and the storage drive is made uniform.

Further, when detecting the abnormality in communication with the storage drive, the switch device transmits the message for notifying each of the processors selected from the connected processors of the abnormality. Accordingly, prompt processing can be performed for the abnormality. Characteristics of the present embodiment can be applied to a storage device using a communication protocol different from the communication protocol of the above configuration example.

The embodiment described above is detailed for easy understanding but the invention is not necessarily limited to include all the above configurations. Further, a part of the configuration of one example can be replaced with the configuration of another example, and the configuration of another example can be added to the configuration of one example. Further, another configuration may be added to a part of the configuration of each example, and the part of the configuration may be deleted or replaced with another the configuration.

Further, a part or all of the above configurations, functions, processing units, processing means, and the like may be implemented by hardware, for example, through designing an integrated circuit. The above configurations, functions, and the like may also be implemented by software by means of interpreting and performing a program, by a processor, for implementing respective functions.

Further, information of a program, a table, or a file that implements each function may be stored in a storage device such as a memory, a hard disk or an SSD, or in a storage medium such as an IC card, an SD card, or a DVD. Further, control lines and information lines indicate what is considered necessary for description, and not all control lines and information lines in the products are shown. In practice, it may be considered that almost all configurations are connected to each other.

What is claimed is:

1. A storage device, comprising:
  a plurality of controllers;
  a plurality of storage drives; and
  a plurality of switch devices each including a plurality of controller-side ports respectively connected to controllers of the plurality of controllers and a plurality of drive-side ports respectively connected to the plurality of storage drives,
    wherein each of the plurality of switch devices includes:
    a plurality of controller-side switches configured to communicate with the controllers of the plurality of controllers via the plurality of controller-side ports;
    a drive-side switch configured to communicate with the plurality of storage drives via the plurality of drive-side ports; and
    an address translation unit configured to perform an address translation between the controller-side switches and the drive-side switch,
  wherein the drive-side switch is connected to the plurality of controller-side switches, and
  wherein each of the plurality of storage drives are directly connected to each of the plurality of switch devices.

2. The storage device according to claim 1,
  wherein each of the controller-side switch and the drive-side switch is a virtual switch.

3. The storage device according to claim 1,
  wherein when detecting an abnormality in one of the plurality of drive-side ports, the switch device is configured to notify the plurality of controllers of a message indicating the abnormality via the plurality of controller-side ports, respectively.

4. The storage device according to claim 3,
  wherein the controller notified of the abnormality is configured to cancel IO requests already-issued and to be issued to the one port where the abnormality has been detected.

5. The storage device according to claim 3,
  wherein one of the plurality of controllers is configured to perform recovery processing from the abnormality when another controller is not performing the recovery processing from the abnormality.

6. The storage device according to claim 1,
  wherein when detecting an abnormality in one of the plurality of drive-side ports, the switch device is configured to refer to information specifying a controller notified of the abnormality and select a controller notified of the abnormality from the plurality of controllers.

7. A communication method of a storage device, the storage device including a plurality of controllers, a plurality of storage drives and a plurality of switch devices each including a plurality of switch devices each including a plurality of controller-side ports respectively connected to controllers of the plurality of controllers, a plurality of drive-side ports respectively connected to the plurality of storage drives, a plurality of controller-side switches, a drive-side switch and an address translation unit, the method comprising:
- causing the plurality of controller-side switches to communicate with a plurality of controllers via a plurality of controller-side ports, respectively;
- causing the drive-side switch to communicate with a plurality of storage drives via a plurality of drive-side ports, respectively; and
- causing the address translation unit to perform address translations between the controller-side switch and the drive-side switch,
- wherein each of the plurality of storage drives are directly connected to each of the plurality of switch devices.

8. The storage device according to claim 1, further comprising:
- a drive box including the plurality of storage drives and the plurality of switch devices; and
- a plurality of nodes each including at least two controllers of the plurality of controllers,
- wherein the plurality of switch devices in each drive box are connected to different controllers of different nodes.

9. The storage device according to claim 8,
- wherein the plurality of controller-side switches in each of the plurality of switch devices are connected to controllers in different nodes, respectively.

10. The storage device according to claim 8,
- wherein the storage drives are accessible from a plurality of the controllers of each of a plurality of nodes, and
- wherein the plurality of controllers access the storage drives through different switch devices, respectively.

* * * * *